(12) United States Patent
Mullally

(10) Patent No.: US 8,128,060 B2
(45) Date of Patent: Mar. 6, 2012

(54) NON-SLIDING SOLENOID VALVE

(75) Inventor: Michael J. Mullally, Clifton Springs, NY (US)

(73) Assignee: Valve Tech, Inc., Phelps, NY (US)

( * ) Notice: Subject to any disclaimer, the term of this patent is extended or adjusted under 35 U.S.C. 154(b) by 504 days.

(21) Appl. No.: 12/410,681

(22) Filed: Mar. 25, 2009

(65) Prior Publication Data
US 2010/0243935 A1 Sep. 30, 2010

(51) Int. Cl.
*F16K 31/02* (2006.01)
(52) U.S. Cl. .................. 251/129.16; 251/129.15
(58) Field of Classification Search ............. 251/129.15, 251/129.16
See application file for complete search history.

(56) References Cited

U.S. PATENT DOCUMENTS

| | | | |
|---|---|---|---|
| 3,921,670 A * | 11/1975 | Clippard et al. | 137/625.65 |
| 4,196,751 A * | 4/1980 | Fischer et al. | 137/625.65 |
| 5,083,742 A | 1/1992 | Wylie et al. | |
| 5,197,192 A | 3/1993 | Wylie et al. | |
| 5,329,965 A | 7/1994 | Gordon | |
| 5,950,674 A | 9/1999 | Wylie et al. | |
| 5,983,703 A | 11/1999 | Wylie et al. | |
| 6,220,569 B1 * | 4/2001 | Kelly | 251/129.08 |
| 6,820,651 B2 | 11/2004 | Seuret et al. | |
| 7,009,478 B2 * | 3/2006 | Ermert et al. | 335/220 |
| 7,159,843 B1 | 1/2007 | Mullally et al. | |
| 7,163,187 B2 | 1/2007 | Mullally et al. | |

* cited by examiner

*Primary Examiner* — John Fristoe, Jr.
(74) *Attorney, Agent, or Firm* — Eugene S. Stephens, PC

(57) ABSTRACT

A non-sliding solenoid valve has an armature supported by a spring for movement with no sliding contact with other valve surfaces. An inner perimeter of the spring is snapped into position adjacent to an inner perimeter reference surface on the armature. An outer perimeter of the spring engages a reference surface on a shell of the valve, and another reference surface spaced, from the spring reference surface, receives an outer perimeter of a seat for the valve. When the seat is positioned against its reference surface, this urges the inner and outer perimeters of the spring against respective reference surfaces and completes the assembly with assured accuracy.

16 Claims, 3 Drawing Sheets

NON-SLIDING SOLENOID VALVE

TECHNICAL FIELD

Solenoid valves used in propulsion systems for satellites

BACKGROUND

Two previous U.S. Pat. Nos. 7,159,843 and 7,163,187 suggest solenoid valves in which an armature supported by a spring moves without sliding contact against valve surfaces. These prior art suggestions result in valves that are difficult and expensive to manufacture. They require retainer rings that are press fit in place to hold components in correct operating positions. This requires measuring, trial fitting, and re-machining, which is expensive and results in no two valves being exactly alike. Also, consistent performance of such valves is difficult to achieve. For example, slight changes of position for the inner or outer perimeters of a spring can change the spring force significantly within the small range of travel required for the armatures of such valves.

SUMMARY

Embodiments of the present invention propose assembled structures and positioning systems that are both less expensive and substantially more reliable. These embodiments thus overcomes shortcomings of the prior art suggestions, while also reducing valve manufacturing expense.

The embodiments accomplish this by using a shell that is machined to have reference surfaces for the outer perimeters of both a spring and a valve seat, which assures accurate spacing between these parts. Another reference surface machined on an armature engages an inner perimeter of the spring, which thereby supports the armature. Accurate machining of these reference surfaces then automatically ensures correct positions and inter-relationships of the armature, spring and valve seat.

The reference surfaces also simplify the valve assembly. The spring can be snapped into an approximate position on the armature, and the armature and spring can be placed within the shell. Then a seat for the valve can be moved into engagement with the seat reference surface. This brings an inner rim of the seat into engagement with a puck carried by the armature, which moves the puck and the armature against the spring bias. This flexes the spring which urges the inner and outer perimeters of the spring against their respective reference surfaces and also assures that the spring applies a pre-determined preload force pushing the puck against the seat rim.

No retainer rings are required, no accurate press fits are needed and the desired assembly positions of the components are automatically set simply by positioning the seat against its reference surface. The seat is then welded to the shell to ensure that the armature and spring components maintain their positions during opening and closing cycles of the valve.

A non-magnetic ring arranged within the shell is engaged by the armature to stop a fully opened valve position that holds the armature clear of magnetic material. This assures that the armature releases quickly when the solenoid current stops so that the armature moves the puck under spring bias to a closed position against the seat rim.

DRAWINGS

DETAILED DESCRIPTION

Figure 1:
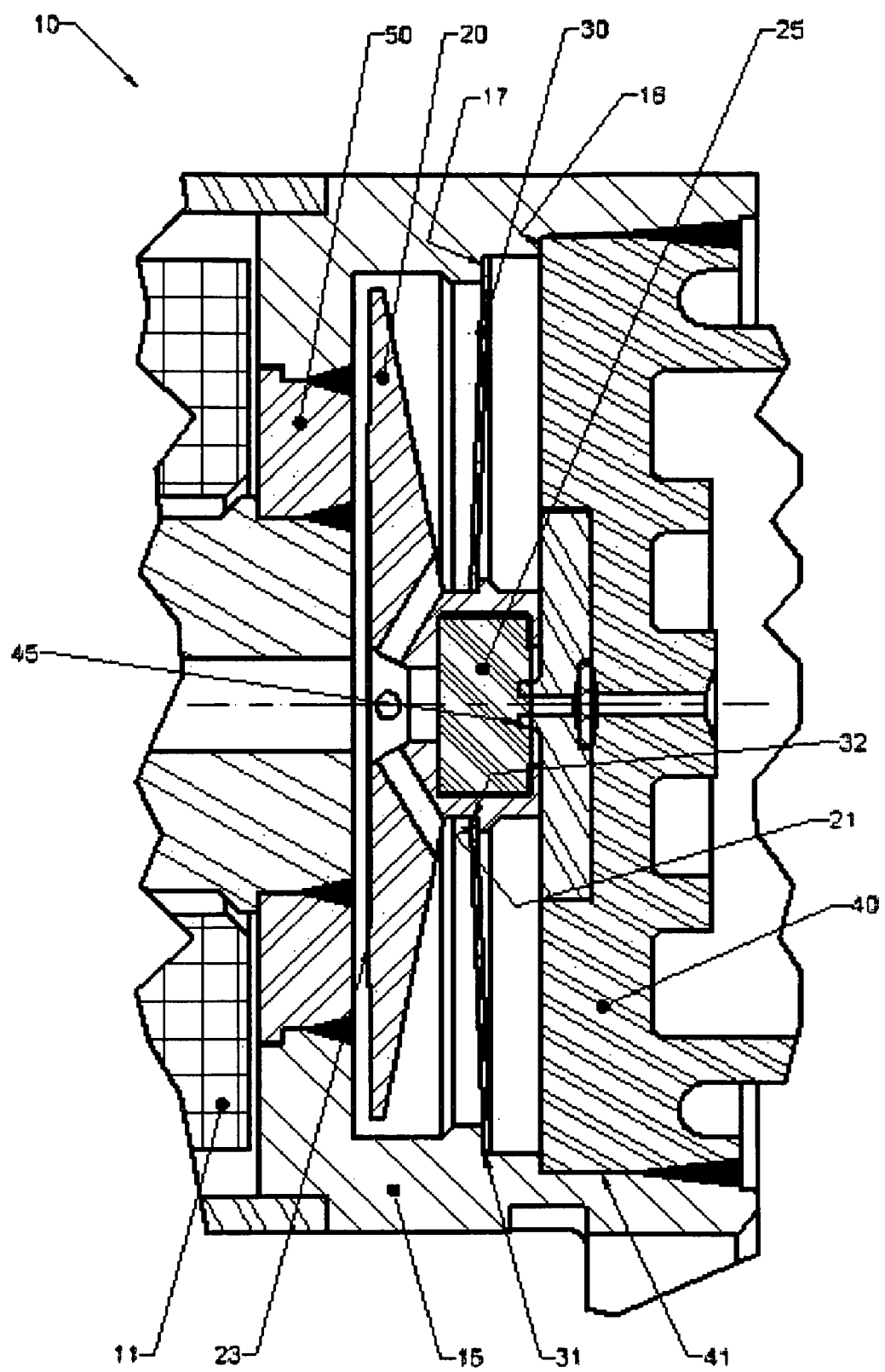
FIG. 1 is a fragmentary cross-sectional view of a non-sliding solenoid valve showing a preferred assembly of components according to the invention.

Solenoid valve 10, as illustrated in FIG. 1, shows a preferred assembly of components. These include solenoid coil 11, shell 15, armature 20, puck 25, which is preferably elastomeric, armature support spring 30, and valve seat 40. Shell 15 is machined to form a reference surface 16 to engage an outer perimeter 41 of valve seat 40 and a reference surface 17 dimensioned to engage an outer perimeter 31 of spring 30. Reference surfaces 16 and 17 face toward valve seat 40.

Another reference surface 21 is formed preferably around an armature chamber 26 containing puck 25, and reference surface 21 is positioned to engage inner perimeter 32 of spring 30. Armature reference surface 21 faces away from seat 40 and has an inclined surface 22 over which the inner perimeter 32 of spring 30 can be snapped into position. A similar effect can be obtained by forming a groove around puck chamber 26 into which inner perimeter 32 of spring 30 can be snapped. The edge of such a groove closest to valve seat 40 would then become the reference surface.

Figure 2:
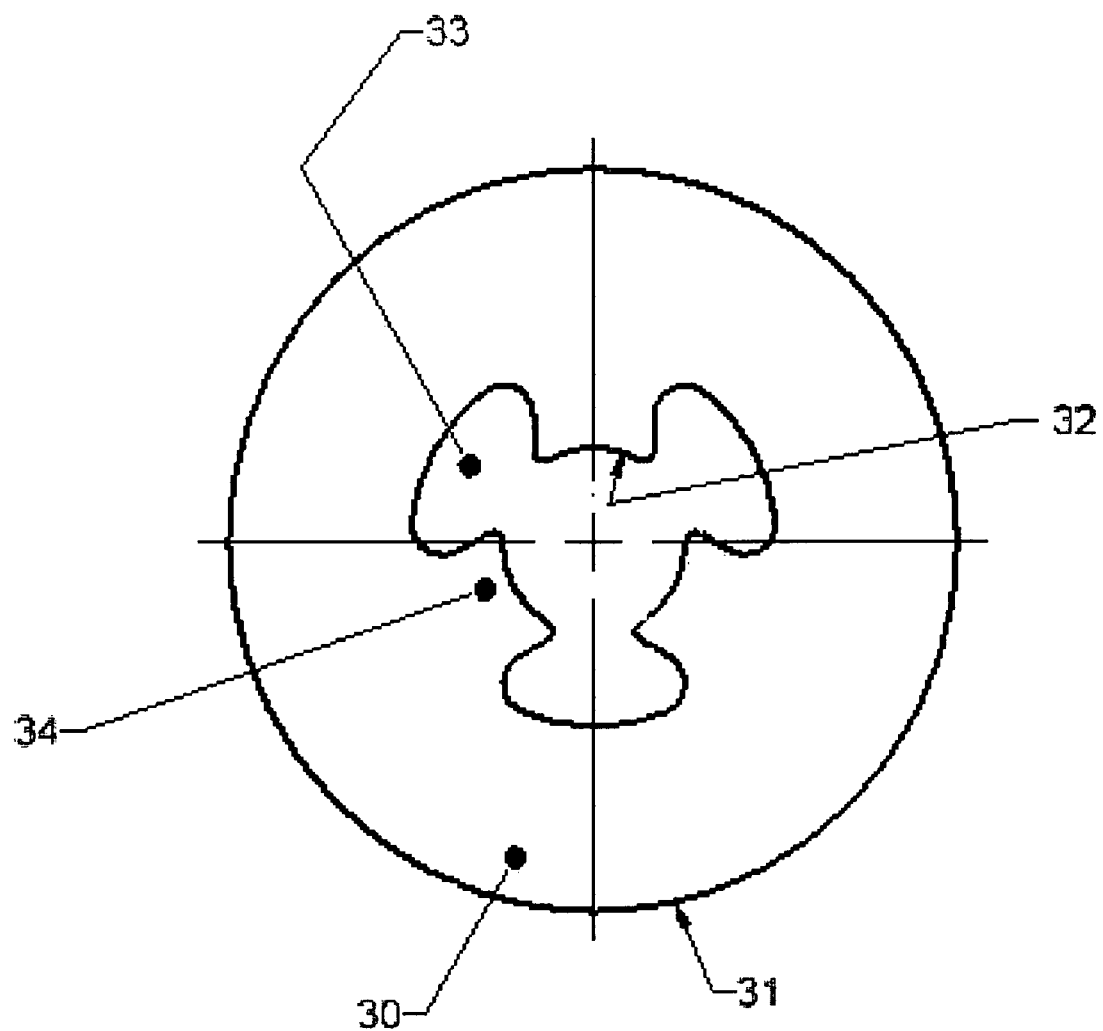
FIG. 2 is a plan view of a preferred embodiment of an armature support spring according to the invention.
Figure 3:
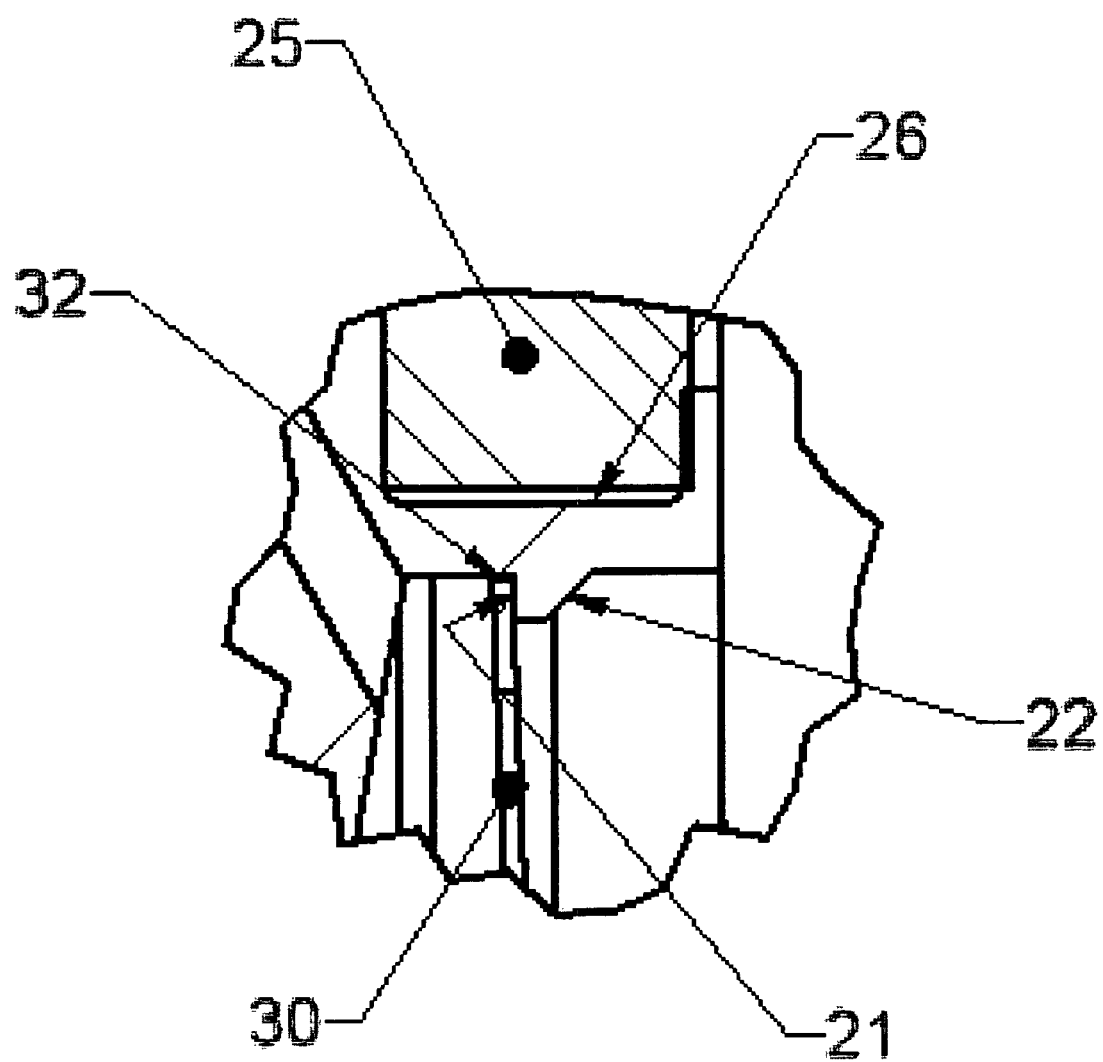
FIG. 3 is an enlarged detail taken from FIG. 1.

FIG. 2 shows a preferred embodiment of spring 30 having cut outs 33 that form flexible limbs 34 that lead to inner perimeter 32. Spring 30 can be shaped in a multitude of ways to provide a desired spring force within its excursion range. Different numbers and shapes of cut-outs and different numbers and sizes of flexible limbs, for example, can be configured to make spring 30 perform in a desired way.

Another structural detail of the preferred embodiment of FIG. 1 is a non-magnetic ring 50 formed within shell 15 where it can serve as a limit stop for the fully opened position of armature 20 carrying puck 25. A face 23 of armature 20 is preferably machined to engage non-magnetic ring 50 while the rest of armature 20 stays clear of surrounding magnetic material in a flux path from solenoid coil 11. This helps ensure that when current is cut off to coil 11, after opening valve 10, armature 20 releases promptly and moves under spring force to push puck 25 against inner rim 45 of valve seat 40.

The component assembly of FIG. 1 does not use any retaining rings, which require an accurate press fit. Instead, the necessary locating is accomplished by reference surfaces 16 and 17 in shell 15 and armature reference surface 21. Reference surface 17 for the outer perimeter of spring 30 faces toward seat 40, and armature reference surface 21 for the inner perimeter 32 of spring 30 faces away from seat 40. When seat 40 is moved into position against its reference surface 16, this movement pushes the inner and outer perimeters of spring 30 into their proper positions against respective inner and outer reference surfaces 21 and 17. This assures accurate location of outer spring perimeter 31 and inner spring perimeter 32. It also causes a predetermined flexure of spring 30, which establishes a predetermined preload force pushing puck 25 against inner seat rim 45.

The necessary reference surfaces can be machined to the required accuracy in successive operations on shell 15. Reference surface 21 on armature 20 can also be machined accurately to receive inner perimeter of spring 30. The accurate pre-machining of reference surfaces then assures the accurate positioning of valve components and accurate operation of these components in opening and closing the valve.

Once the components are simply and accurately machined, valve assembly proceeds quickly and conveniently. Spring 30 is pressed onto armature 20 so that its inner perimeter 32 flexes over inclined surface 22 and snaps into position adjacent to armature reference surface 21. Armature 20 and spring 30, thus assembled, are simply inserted into shell 15. Then, seat 40 is pressed into position against shell reference surface 16 to hold everything in place. Inner seat rim 45 engages and presses against puck 25 as seat 40 is moved into position against its reference surface 16. This moves puck 25 and armature 20 and spring 30 in a direction that flexes spring 30. This provides a force that moves outer perimeter 31 of spring 30 against shell reference surface 17 and also moves inner perimeter 32 of spring 30 against armature reference surface 21. Such a flexed position of spring 30 applies a predetermined valve closure force urging puck 25 against seat rim 45. Seat 40 is then welded into position in shell 15 to hold all the assembled components in their proper positions for future operation.

When solenoid coil 11 is actuated, it magnetically pulls armature 20 to pull puck 25 away from seat rim 45 to open the valve. The limit of the opening armature movement occurs when armature face 23 engages non-magnetic ring 50. In this position, armature 20 maintains a magnetic air gap with magnetic valve material surrounding ring 50.

The avoidance of press fit positioning rings, and the simplicity of the machining operations required makes assembly of valve 10 relatively simple and inexpensive. The accuracy of the assembly achieved then ensures that the valve performs reliably throughout its working life. This is especially important for valves used in satellites where repairs may be very expensive or even impossible.

What is claimed is:

1. An assembly for a non-sliding valve that includes a solenoid armature, a support spring holding the armature for movement without sliding contact with any valve surface, a puck carried by the armature, and a valve seat disposed to engage the puck, the improvement comprising:
   a shell machined to form an outer spring reference surface engaging an outer perimeter of the spring;
   the shell being machined to form a seat reference surface spaced from the outer spring reference surface to engage an outer perimeter of the seat;
   the armature being machined to form a reference surface engaged by an inner perimeter of the spring; and
   engagement of the outer perimeter of the seat against the seat reference surface flexes the spring, while urging the puck against an inner rim of the seat, and moves the armature to urge the inner and outer perimeters of the spring respectively against the inner and outer spring reference surfaces.

2. The assembly of claim 1 wherein flexure of the spring holds the inner and outer perimeters of the spring against the spring reference surfaces without requiring retainer rings.

3. The assembly of claim 1 wherein a sloping surface leads to the armature reference surface so that the inner perimeter of the spring can be pressed over the sloping surface to snap into position adjacent to the armature reference surface.

4. A method of predetermining operating positions of components of a non-sliding solenoid valve having a spring holding an armature for movement without sliding contact with any other valve surface and a seat having an inner perimeter rim engaging a puck held by the armature, the method comprising:
   machining reference surfaces in a shell at predetermined spaced apart locations to separately engage outer perimeters of the spring and the seat;
   machining a spring reference surface on the armature to engage an inner perimeter of the spring;
   positioning the armature and the spring within the shell;
   moving an outer perimeter of the seat into engagement with the seat reference surface in the shell so that an inner perimeter rim of the seat engages the puck, moves the armature and flexes the spring resulting in the following:
   the outer perimeter of the spring is urged against its reference surface in the shell;
   the inner perimeter of the spring is urged against the spring reference surface on the armature; and
   the spring flexes to cause a predetermined preload pressing the puck against the seat rim.

5. The method of claim 4 wherein a sloping surface leads to the armature reference surface so that the inner perimeter of the spring can be pressed over the sloping surface to snap into position adjacent to the armature reference surface.

6. A non-sliding solenoid having a spring supporting an armature for movement without sliding contact with any other valve surface, the valve comprising:
   an outer perimeter of the spring engaging a spring reference surface formed in the shell;
   an outer perimeter of a valve seat engaging a seat reference surface formed in the shell;
   the spring reference surface and the seat reference surface being spaced apart in the shell;
   an inner perimeter of the spring engaging an armature reference surface;
   an inner perimeter of the seat having a rim engaging a puck carried by the armature; and
   the spring, the seat, and the reference surfaces being dimensioned so that engagement of the outer perimeter of the seat with the seat reference surface in the shell flexes the spring to engage both of its inner and outer seats to apply a predetermined force pressing the puck against the seat rim in a closed valve position.

7. The non-sliding valve of claim 6 wherein a sloping surface leads to the armature reference surface so that the inner perimeter of the spring can be pressed over the sloping surface to snap into position adjacent to the armature reference surface.

8. A positioning system for components of a solenoid valve having an armature carrying a puck and supported by a spring so that the armature can move without sliding in contact with any valve surface, the positioning system comprising:
   a shell having a spring reference surface engaging and positioning an outer perimeter of the spring;
   the shell having a seat reference surface spaced from the spring reference surface and engaged by an outer perimeter of a seat to position the seat relative to the spring;
   an inner perimeter of the spring having a snap fit onto the armature adjacent to a spring positioning surface of the armature;
   an inner perimeter of the seat having a rim disposed to engage the puck; and
   the spring, armature, puck, and seat rim all being positioned by bringing the seat into engagement with the seat reference surface which brings the seat rim into engagement with the puck, moves the armature against spring bias, urges the inner perimeter of the spring against the armature spring positioning surface, urges the outer perimeter of the spring against the spring reference surface and applies a predetermined preload pressing the puck against the seat rim.

9. The positioning system of claim 8 wherein positions of the inner and outer perimeters of the spring in a closed valve position are established without use of retainer rings.

10. The positioning system of claim 8 wherein the shell includes a non-magnetic ring engaging the armature in an open valve position that leaves the armature spaced from magnetic material.

11. The positioning system of claim 8 wherein the outer perimeter of the seat is welded to the shell.

12. A non-sliding solenoid valve assembly comprising:
   an armature supported by a spring to move without sliding contact with any valve surface;
   an inner perimeter of the spring being snapped onto the armature near a positioning surface formed on the armature;
   a spring reference surface formed in a shell surrounding the armature to fix a position of an outer perimeter of the spring;
   a puck carried by the armature;
   a valve seat having an inner rim engaging the puck;
   the shell having a seat reference surface spaced from the spring reference surface to position an outer rim of the seat; and
   the positioning surface on the armature and the spring and seat reference surfaces in the shell being dimensioned so that when the seat engages the seat reference surface, the inner rim engages the puck, which moves the armature against a bias of the spring to urge the puck against the seat rim with predetermined force.

13. The valve assembly of claim 12 wherein the predetermined force urges the inner perimeter of the spring against the armature positioning surface and urges the outer perimeter of the spring against the spring reference surface.

14. The valve assembly of claim 12 wherein the seat is welded to the shell with the outer perimeter of the seat engaging the shell reference surface.

15. The valve assembly of claim 12 wherein the shell includes a non-magnetic ring engaged by the armature in a fully opened position.

16. The valve assembly of claim 12 wherein the positioning surface on the armature is formed opposite an incline helping the inner perimeter of the spring to snap onto the armature to a position adjacent to the positioning surface.

* * * * *